United States Patent
Abele et al.

(10) Patent No.: US 12,397,604 B2
(45) Date of Patent: Aug. 26, 2025

(54) CONTROLLER, CONTROL METHOD, AND COMPUTER PROGRAM PRODUCT FOR A VEHICLE WHICH HAS A CHASSIS PART AND A DRIVER CAB PART THAT CAN BE FOUND ON THE CHASSIS PART

(71) Applicant: ZF Friedrichshafen AG, Friedrichshafen (DE)

(72) Inventors: Marc Abele, Radolfzell (DE); Mark Mohr, Tettnang (DE); Friedrich Tenbrock, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 590 days.

(21) Appl. No.: 17/604,229

(22) PCT Filed: Mar. 21, 2020

(86) PCT No.: PCT/EP2020/057897
§ 371 (c)(1),
(2) Date: Oct. 15, 2021

(87) PCT Pub. No.: WO2020/212082
PCT Pub. Date: Oct. 22, 2020

(65) Prior Publication Data
US 2022/0203797 A1    Jun. 30, 2022

(30) Foreign Application Priority Data
Apr. 16, 2019   (DE) ................. 10 2019 205 455.2

(51) Int. Cl.
*B60G 17/0195* (2006.01)
*B60G 17/0165* (2006.01)
(Continued)

(52) U.S. Cl.
CPC ...... *B60G 17/0195* (2013.01); *B60G 17/0165* (2013.01); *B60G 99/002* (2013.01);
(Continued)

(58) Field of Classification Search
CPC ............ H04N 23/6811; H04N 23/685; B60G 2401/14; B60G 2204/162; B60G 99/002; B60G 17/0165; B60G 17/0195
(Continued)

(56) References Cited

U.S. PATENT DOCUMENTS 5,850,254 A * 12/1998 Takano ................ G05D 1/0246
                                                        382/104
10,828,955 B1 * 11/2020 Edren ................. B60G 17/0528
(Continued)

FOREIGN PATENT DOCUMENTS

DE    10 2010 013 339 A1    1/2011
DE    10 2011 114 977 A1    1/2013
(Continued)

OTHER PUBLICATIONS

Google patents translation of DE 102015115883 A1 (Year: 2015).*
(Continued)

*Primary Examiner* — Yazan A Soofi
(74) *Attorney, Agent, or Firm* — Crowell & Moring LLP

(57) ABSTRACT

A control unit for a vehicle that has a chassis and a driver's cab on the chassis, comprising a first data interface for receiving image data generated by an imaging sensor, a second data interface for receiving vehicle state data generated by a vehicle state sensor, an evaluation unit for evaluating the image data and/or the vehicle state data in order to generate a first control signal on the basis of the evaluation of the image data, which is configured to counteract a relative movement between the chassis and the driver's cab and/or generate a second control signal on the (Continued)

basis of the evaluation of the vehicle state data, which is configured to correct a setting of the imaging sensor, and a signal output unit for outputting the first and/or second control signals.

19 Claims, 2 Drawing Sheets

(51) Int. Cl.
*B60G 99/00* (2010.01)
*B62D 33/06* (2006.01)
*H04N 23/68* (2023.01)

(52) U.S. Cl.
CPC ..... *B62D 33/0604* (2013.01); *H04N 23/6811* (2023.01); *H04N 23/685* (2023.01); *B60G 2204/162* (2013.01); *B60G 2401/14* (2013.01)

(58) Field of Classification Search
USPC .......................................................... 701/38
See application file for complete search history.

(56) References Cited

U.S. PATENT DOCUMENTS

| | | | | |
|---|---|---|---|---|
| 11,390,129 | B1* | 7/2022 | Edren | ................ B60G 17/0155 |
| 11,768,281 | B2* | 9/2023 | Villalobos-Martinez | .................... G01B 11/14 356/620 |
| 2014/0114545 | A1* | 4/2014 | Groger | .................. B60T 8/1701 701/99 |
| 2014/0240500 | A1 | 8/2014 | Davies | |
| 2018/0079272 | A1* | 3/2018 | Aikin | ..................... B60W 30/02 |
| 2018/0093543 | A1* | 4/2018 | Hadi | .................. B60G 17/0185 |
| 2018/0362051 | A1* | 12/2018 | Hu | .................. B60W 60/00186 |
| 2019/0120967 | A1* | 4/2019 | Smits | ...................... G01S 17/42 |
| 2020/0341118 | A1* | 10/2020 | Chen | ..................... B60W 30/18 |
| 2021/0268998 | A1* | 9/2021 | Brickwedde | .............. B60T 7/12 |
| 2022/0105772 | A1* | 4/2022 | Kim | ................... B60G 17/0165 |
| 2022/0105773 | A1* | 4/2022 | Kim | ........................ B60G 17/06 |
| 2022/0105776 | A1* | 4/2022 | Kim | ........................ B60G 17/06 |

FOREIGN PATENT DOCUMENTS

| | | | |
|---|---|---|---|
| DE | 102015115883 | A1 * | 3/2017 |
| DE | 10 2019 205 455 | A1 | 10/2020 |
| WO | WO 2020/212082 | A1 | 10/2020 |

OTHER PUBLICATIONS

DE-102015115883-A1 EPO English translation (Year: 2024).*
EPO English Translation of FOR reference.*
International Search Report (with English Translation) and Written Opinion issued in PCT/EP2020/057897 completed Jun. 4, 2020, and mailed on Jun. 19, 2020 (12 pages).

* cited by examiner

CONTROLLER, CONTROL METHOD, AND COMPUTER PROGRAM PRODUCT FOR A VEHICLE WHICH HAS A CHASSIS PART AND A DRIVER CAB PART THAT CAN BE FOUND ON THE CHASSIS PART

CROSS-REFERENCE TO RELATED APPLICATIONS

This application is a U.S. national stage application under 35 U.S.C. § 371 of PCT Application No. PCT/EP2020/057897, filed on Mar. 21, 2020, and published as WO 2020/212082 A1 on Oct. 22, 2020, which claims priority from German Application No. DE 10 2019 205 455.2, filed on Apr. 16, 2019, the entirety of which are each hereby fully incorporated by reference herein.

TECHNICAL FIELD

The present invention relates to the field of controllers for vehicles, which have a chassis part and a driver cab part that can be found on the chassis part. In particular, the present invention relates to an automated controller for those types of vehicles, a driver assistance system for the vehicle with regard to object identification, and improving the stability of the state of the vehicle.

TECHNICAL BACKGROUND

In road traffic, it is often impossible to avoid the fact that road surfaces exhibit structural shortcomings such as unevenness. In these situations, the vehicle may vibrate excessively in relation to the road surface. This can sometimes result in severe skidding in passenger vehicles, which can lead to bodily injury to the vehicle occupants. In the case of freight transport, the freight may be crushed together or against the walls of the vehicle, thus damaging the freight.

To counteract the unevenness in the road surface, DE 10 2010 013 339 A1 proposes the use of an imaging unit that is able to detect the unevenness in advance. The engine mount is controlled on the basis of the results of the imaging such that the operating parameters for the engine mount can be adapted to the current road surface.

Depending on its construction, the control mechanism may not be able to adequately counter against the vibrations in the vehicle.

The fundamental object of the invention is therefore to improve the control mechanism for vehicle known from the prior art regarding minimizing the vibrations in the vehicle caused by unevenness in the road surface.

This object is achieved by a controller and a control method, as well as a computer program according to the independent claims.

The controller is an electronic control unit (ECU), by way of example. The vehicle that is controlled using the control unit is preferably a cargo vehicle. The vehicle's chassis is in contact with the roadway through the wheels when the vehicle is on the roadway, or traveling on the roadway. The driver cab is located on the chassis, and can be shifted from its normal position when travelling over unevenness in the road surface.

The imaging sensor is a camera, by way of example, e.g. a stereo and/or surround view camera. A lidar sensor, radar sensor and/or ultrasonic sensor can also be used. The imaging sensor images the vehicle's environment, e.g. the roadway in front of the vehicle, and generates image data.

The sensor for the state of the vehicle is designed to determine a vehicle state parameter, e.g. speed, acceleration, torque, wheel rotational rate, chassis angle of inclination, driver cab angle of inclination, tire pressure, steering angle, or weight of the load on the vehicle's cargo platform. Corresponding vehicle state data are generated from these parameters.

The evaluation unit, which can comprise a central processing unit (CPU) or a graphics processing unit (CPU) evaluates these image data and/or vehicle state data.

When the evaluation unit evaluates the image data, the evaluation unit preferably deduces an incorrect setting of the imaging sensor from the image data relating to the field of vision of a camera, e.g. the focal length, luminosity of the image, color contrast of the image, or the position and/or orientation of the imaging sensor. This then indicates an incorrect setting of the state of the vehicle, which can be traced back to a movement of the driver's cab in relation to the chassis. This relative movement can be a vibration, a shifting of the driver's cab from its normal position, and/or a relative rotation. The evaluation generates the first control signal on the basis of this evaluation, in order to counteract the incorrect state of the vehicle, or the relative movement between the chassis and the driver's cab detected in this manner on the basis of the image data. The first control signal is output by the signal output unit to the vehicle or a mechatronic control and/or regulating element in the vehicle.

This measure according to the invention is advantageous, because it consequentially allows for vibrations in the vehicle can be effectively counteracted. Various parts of the vehicle can vibrate in relation to one another when travelling over unevenness in a roadway. In particular with vehicles that have a chassis and a driver's cab on the chassis, as is the case with a cargo vehicle, for example, the driver's cab may be exposed to strong vibrations, even if the chassis is secured against vibrations caused by the roadway unevenness. To solve this problem, the control unit according to the invention is able to generate a control signal on the basis of the image data, which counteracts the relative movement between the driver's cab and the chassis.

When an evaluation unit evaluates the vehicle state data, the evaluation unit preferably deduces an incorrect setting of the vehicle state from this data relating, e.g., to the speed, acceleration, vehicle or driver's cab angle of inclination, vibrations in the driver's cab in relation to the chassis or roadway, and/or wheel rotational rate. This then indicates an incorrect setting of the imaging sensor. The setting of the imaging sensor can relate to the camera's field of vision, focal length, the color contrast, or the position and/or orientation of the imaging sensor. The evaluation unit then generates the second control signal on the basis of this setting, in order to correct or adapt the setting of the imaging sensor to the current vehicle state. The second control signal is output by the signal output unit to the imaging sensor, or a communication interface connected to the imaging sensor.

The images generated by the imaging sensor can be effectively corrected by this means, without the need for computing intensive and expensive algorithms. The object identification based on imaging sensors, used for example in a driver assistance system or a system for autonomous driving, is advantageously improved by this means. It is also not necessary to correct the incorrect vehicle state parameter in this case in order to ensure the quality of the sensor images.

Advantageous embodiments and developments are described in the dependent claims.

According to one embodiment, the evaluation unit is configured to generate the second control signal as soon as the evaluation unit detects that the deduced vibration between the chassis and the driver's cab has reached a predefined threshold.

The predefined threshold can relate, by way of example, to the frequency, direction of movement, and/or amplitude of the vibration. This results in a particularly precise control unit according to the invention.

According to another embodiment, the evaluation unit is configured to generate the first control signal as soon as the evaluation unit detects that the deduced field of vision differs from a predefined field of vision (reference field of vision) by a predefined tolerance.

The reference field of vision preferably corresponds to the situation in which the vehicle state is not incorrect, e.g. when the vehicle or the driver's cab is not vibrating. The predefined tolerance can be a radius, length, width, center-point position, or shape of the field of vision.

According to another embodiment, the first control signal is configured to operate a regulating unit, in particular one or more regulating elements in a damper regulating unit.

The regulating elements can comprise actuators, for example, which allow for an active influencing of the driver's cab states, in particular the relative movement between the chassis and the driver's cab, or between the chassis and one of the wheels. The actuators can control, e.g., one or more servomotors and/or hydraulic cylinders. As a result, any vibrations between the driver's cab and the chassis can be actively counteracted in this manner. The regulating circuit used for this can interact with the imaging sensor via the control unit or evaluation unit, such that a regulation acting on the vehicle state parameter, e.g. the active damping regulation of the driver's cab, is activated until the setting is no longer incorrect (e.g. until the difference between the deduced field of vision for the imaging sensor and the reference field of vision falls below the predefined threshold).

The computer program for controlling a sensor assembly is designed such that it can be installed in a memory in a computer, and comprises software code with which the steps of the method according to the invention for controlling the sensor assembly can be carried out when the computer program runs on the computer.

A program belongs to the software in a data processing system, e.g. an evaluation unit or computer. Software is a collective term for programs and their associated data. The complement to software is hardware. Hardware refers to the mechanical and electronic elements in a data processing system. A computer is an evaluation unit.

Computer programs normally comprise a series of commands with which the hardware executes a specific method when the program is installed, leading to a specific result. When the program in question is used on a computer, the computer program gives rise to the aforementioned technical effect.

The computer program according to the invention is not dependent on the platform. This means that it can be executed on any computing platform. The computer program is preferably executed on an evaluation device according to the invention for recording a vehicle's environment.

The software code is written in an arbitrary programming code, e.g. Python.

Embodiments of the invention shall be described below in reference to the drawings. Therein:

The same reference symbols in the drawings refer to the same or functionally similar parts. The relevant reference parts are each labeled in the individual figures.

Figure 1:
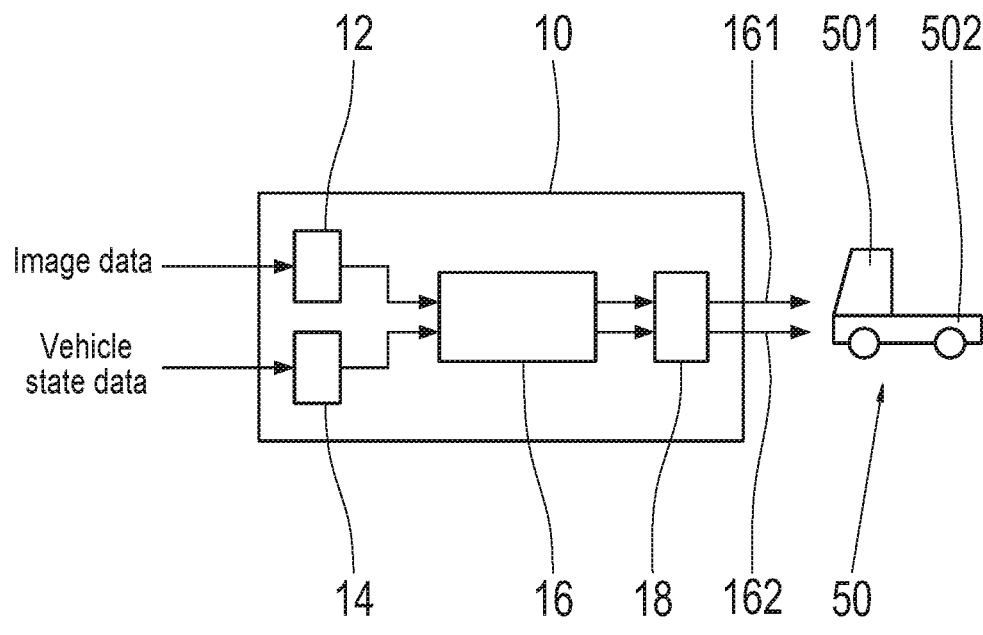
FIG. 1 shows a schematic illustration of a control unit according to one embodiment.

FIG. 1 shows a schematic illustration of a control unit 10 according to an embodiment. The control unit 10 is used for a vehicle 50 that has a chassis 501 and a driver's cab 502 located on the chassis 501. The vehicle 50 in this case is a cargo vehicle.

The control unit 10 comprises a first data interface 12 for receiving image data generated by an imaging sensor 22, and a second data interface 14 for receiving vehicle state data generated by a vehicle state sensor 32.

The control unit 10 also comprises an evaluation unit 16 for evaluating the image data and/or vehicle state data. A first control signal 161 is generated by the evaluation unit 16 on the basis of the evaluation of the image data, which is configured to counteract a relative movement between the chassis 501 and the driver's cab 502. A second control signal 162 is generated on the basis of the evaluation of the vehicle state data, which is configured to correct a setting of the imaging sensor 22. The control unit 10 also comprises a signal output unit 18 for outputting the first and/or second control signals 161, 162. The outputting of the respective control signals 161, 162 to the vehicle 50 is shown here by way of example. Alternatively, the first control signal 161 can be output to a mechatronic regulating unit 42, 44. The second control signal 162 can also be output to the imaging sensor 22 or a device (such as a cloud-based central control unit) that is used to set the imaging sensor.

Figure 2:
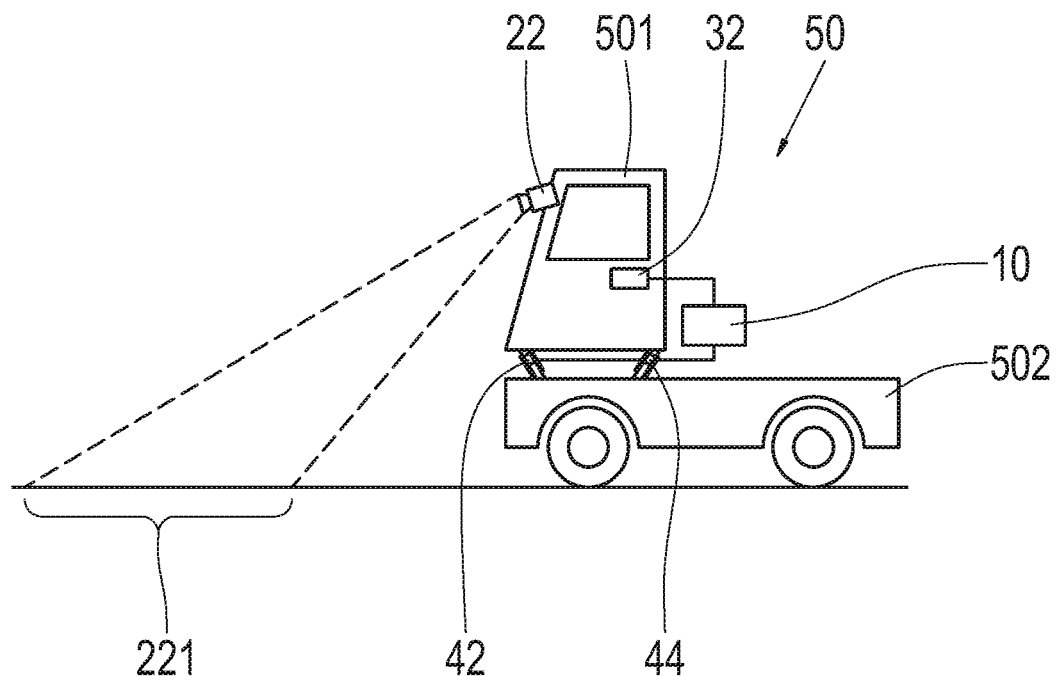
FIG. 2 shows a schematic illustration of the control unit from FIG. 1 when used in a vehicle.

The control unit 10 can be integrated in the vehicle 50, as is shown in greater detail in FIG. 2. The control unit 10 can also be designed as a separate device from the vehicle 50, which communicates with the vehicle 50, the imaging sensor 22, and/or the vehicle state sensor 32 via a communication medium, or a communication channel such as WLAN, NFC, Bluetooth, or infrared.

An example is shown in FIG. 2 in which the imaging sensor 22 is attached to the vehicle 50, in particular the driver's cab 501 in the vehicle 50. The vehicle state sensor 32 is also attached to the driver's cab 501.

Alternatively, at least one of the two sensors 22, 32 can be placed outside the vehicle 50, or the driver's cab 501.

Figure 3:
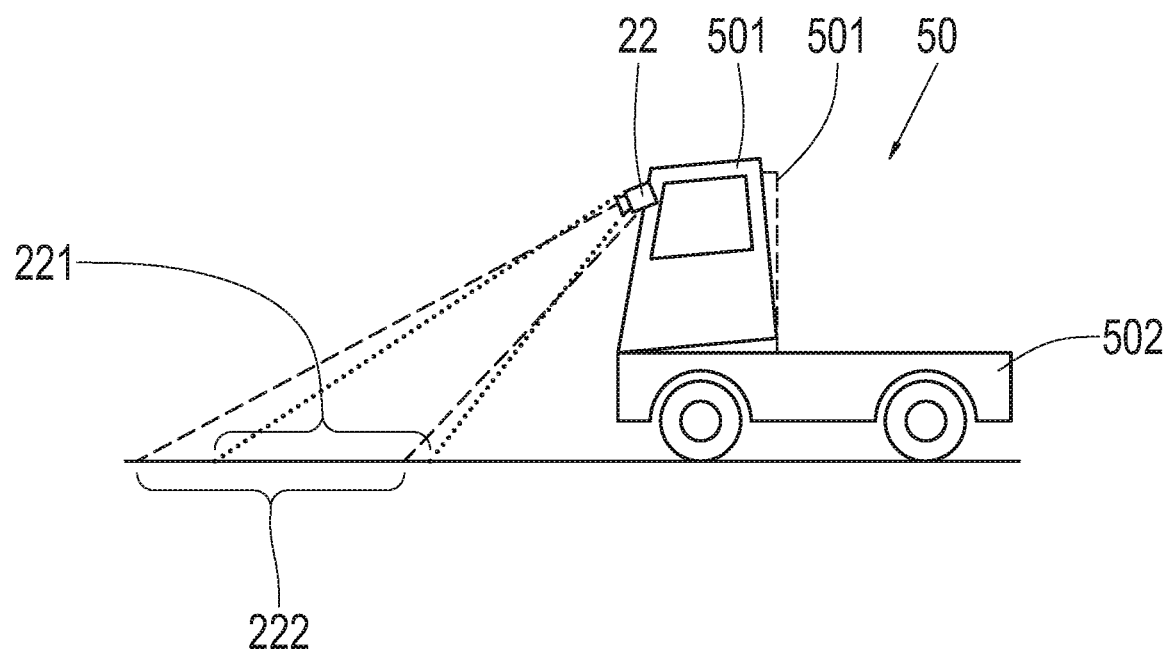
FIG. 3 shows a schematic illustration of the vehicle in which the driver's cab is tilted forward.

FIG. 3 shows a schematic illustration of the vehicle 50 in which the driver's cab 501 is tilted forward due to vibrations. The normal position of the driver's cab 501 is indicated by broken lines, for comparison purposes. A field of vision 221 and a reference field of vision 222 are shown for the tilted position and the normal position of the driver's cab 501.

When the evaluation unit 16 evaluates the image data, the evaluation unit deduces an incorrect setting of the imaging sensor 22 from the image data. As is shown by way of example in FIG. 3, the incorrect setting of the field of vision 221 relates to the camera 22 that is used. This then indicates an incorrect setting of the vehicle state, which can be traced back to a relative movement between the driver's cab 501 (indicated by a solid line in FIG. 3), and the chassis 502. This relative movement can be caused in particular by vibrations in the vehicle 50, wherein the vibrations of the driver's cab 501 in relation to the chassis 502 must be compensated for. The evaluation unit 16 generates the first control signal 161 on the basis of this evaluation, in order to counteract the relative movement between the chassis 502 and the driver's cab 501.

As is shown by way of example in FIGS. 1 and 2, the first control signal 161 can be output by the signal output unit 18 to a mechatronic regulating unit, in particular to regulating elements 42, 44 in the vehicle for vibration damping. The current field of vision 221 imaged in realtime by the imaging sensor or camera 22 can be compared with the reference field of vision 222 in the regulating mechanism used herein. The damping regulation can be continued until the current field of vision 221 is aligned with the reference field of vision within a predefined tolerance.

REFERENCE SYMBOLS 10 control unit
12 first data interface
14 second data interface
16 evaluation unit
161 first control signal
162 second control signal
18 signal output unit
22 imaging sensor
221 field of vision
222 reference field of vision
32 vehicle state sensor
42, 44 regulating unit
50 vehicle
501 driver's cab
502 chassis

The invention claimed is:

1. A control unit for a vehicle comprising a chassis and a driver's cab on the chassis, the control unit comprising:
a first data interface configured to receive image data generated by an imaging sensor;
a second data interface configured to receive vehicle state data generated by a vehicle state sensor different from the imaging sensor;
at least one processing device configured to:
evaluate at least one of the image data or the vehicle state data, and
generate a second control signal on a basis of the evaluation of the vehicle state data, which second control signal is configured to correct a setting of the imaging sensor; and
a signal output interface configured to output the second control signal.

2. The control unit according to claim 1, wherein the at least one processing device is configured to deduce a vibration between the chassis and the driver's cab from the vehicle state data.

3. The control unit according to claim 2, wherein the at least one processing device is configured to generate the second control signal as soon as the at least one processing device has detected that the deduced vibration between the chassis and the driver's cab has reached a predefined threshold.

4. The control unit according to claim 1, wherein the second control signal is configured to correct an incorrect field of vision of the imaging sensor based on the evaluation of the vehicle state data.

5. The control unit according to claim 1, wherein the at least one processing device is configured to:
evaluate both of the image data and the vehicle state data by the at least one processing device; and
generate a first control signal on a basis of the evaluation of the image data, wherein the first control signal is configured to operate a mechatronic damping regulating unit comprising actuators configured to counteract a relative movement between the chassis and the driver's cab based on the first signal; and
wherein the signal output interface is configured to:
output the first control signal to the mechatronic damping regulating unit.

6. The control unit according to claim 5, wherein the at least one processing device is configured to deduce a field of vision from the imaging sensor.

7. The control unit according to claim 6, wherein the at least one processing device is configured to generate the first control signal as soon as the at least one processing device has detected that the deduced field of vision differs from a predefined field of vision by a predefined tolerance.

8. A vehicle comprising a chassis and a driver's cab on the chassis, the vehicle further comprising the control unit according to claim 1.

9. A control method for a vehicle that has a chassis and a driver's cab on the chassis, the control method comprising:
receiving image data generated by an imaging sensor via a first data interface;
receiving vehicle state data generated by a vehicle state sensor via a second data interface, wherein the vehicle state sensor is different from the imaging sensor;
evaluating at least one of the image data or the vehicle state data by at least one processing device;
generating a second control signal on a basis of the evaluation of the vehicle state data, which second control signal is configured to correct a field of vision of the imaging sensor; and
outputting the second control signal via a signal output interface.

10. A non-transitory computer readable medium storing thereon a computer program for a vehicle a chassis and a driver's cab on the chassis, wherein, when executed by a computer, the computer program causes the computer to execute the method according to claim 9.

11. The method according to claim 9 further comprising:
deducing, by the at least one processing device, a vibration between the chassis and the driver's cab from the vehicle state data.

12. The method according to claim 11 further comprising:
generating the second control signal as soon as the at least one processing device has detected that the deduced vibration between the chassis and the driver's cab has reached a predefined threshold.

13. The method according to claim 9 further comprising:
correcting an incorrect field of vision of the imaging sensor with the second control signal.

14. The method according to claim 9 further comprising:
deducing, by the at least one processing device, the field of vision from the imaging sensor.

15. The method according to claim 9, further comprising:
evaluating both of the image data and the vehicle state data by the at least one processing device;
generating a first control signal on a basis of the evaluation of the image data, wherein the first control signal is configured to operate a mechatronic damping regulating unit comprising actuators configured to counteract a relative movement between the chassis and the driver's cab based on the first signal; and
outputting the first control signal via the signal output interface to the mechatronic damping regulating unit.

16. The method according to claim 15 further comprising:
generating the first control signal as soon as the at least one processing device has detected that the deduced field of vision differs from a predefined field of vision by a predefined tolerance.

17. A control unit for a vehicle comprising a chassis and a driver's cab on the chassis, the control unit comprising:
a first data interface configured to receive image data generated by an imaging sensor;
a second data interface configured to receive vehicle state data generated by a vehicle state sensor;
at least one processing device configured to:
evaluate at least one of the image data or the vehicle state data; and
generate a first control signal on a basis of the evaluation of the image data, wherein the first control signal is configured to operate a mechatronic damping regulating unit comprising actuators configured to counteract a relative movement between the chassis and the driver's cab based on the first signal; and
a signal output interface configured to output the first control signal to the mechatronic damping regulating unit.

18. The control unit according to claim 17, wherein the at least one processing device is configured to deduce a field of vision from the imaging sensor.

19. The control unit according to claim 18, wherein the at least one processing device is configured to generate the first control signal as soon as the at least one processing device has detected that the deduced field of vision differs from a predefined field of vision by a predefined tolerance.

* * * * *